United States Patent
Hietalahti et al.

(10) Patent No.: US 12,336,051 B2
(45) Date of Patent: Jun. 17, 2025

(54) PROXIMITY SERVICES EMERGENCY CALL

(71) Applicant: NOKIA TECHNOLOGIES OY, Espoo (FI)

(72) Inventors: Hannu Petri Hietalahti, Kiviniemi (FI); Mohamed Amin Nassar, Munich (DE); Ling Yu, Kauniainen (FI); Vinh Van Phan, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/960,523

(22) Filed: Nov. 26, 2024

(65) Prior Publication Data
US 2025/0089128 A1    Mar. 13, 2025

Related U.S. Application Data

(63) Continuation of application No. 18/850,423, filed as application No. PCT/EP2023/057346 on Mar. 22, 2023.

(60) Provisional application No. 63/324,488, filed on Mar. 28, 2022.

(51) Int. Cl.
*H04W 76/50*    (2018.01)
*H04W 48/04*    (2009.01)
*H04W 48/16*    (2009.01)

(52) U.S. Cl.
CPC .......... *H04W 76/50* (2018.02); *H04W 48/04* (2013.01); *H04W 48/16* (2013.01)

(58) Field of Classification Search
CPC ...... H04W 76/50; H04W 48/04; H04W 48/16
USPC ...................................................... 455/404.1
See application file for complete search history.

(56) References Cited

U.S. PATENT DOCUMENTS

2022/0303749 A1*   9/2022   Wu ................... H04W 24/08

FOREIGN PATENT DOCUMENTS

EP         3 979 761 A1    4/2022
WO    WO 2021/146685 A1    7/2021

OTHER PUBLICATIONS

"3rd Generation Partnership Project; Technical Specification Group Services and System Aspects; Proximity-based services (ProSe); Stage 2 (Release 17)", 3GPP TS 23.303 v17.0.0, (Dec. 2021), 130 pages.
"3rd Generation Partnership Project; Technical Specification Group Services and System Aspects; Service aspects; Service principles (Release 17)", 3GPP TS 22.101 v17.5.0, (Jun. 2022), 101 pages.
"3rd Generation Partnership Project; Technical Specification Group Services and System Aspects; Proximity based Services (ProSe) in the 5G System (5GS) (Release 17)", 3GPP TS 23.304 v17.5.0, (Dec. 2022), 106 pages.

(Continued)

*Primary Examiner* — Joel Ajayi
(74) *Attorney, Agent, or Firm* — ALSTON & BIRD LLP (57) ABSTRACT

Systems, methods, apparatuses, and computer program products for emergency sessions, such as emergency calls, using a relay provided by proximity services are provided. For example, a method may include indicating, in a relay discovery procedure, a capability of a relay user equipment to support an emergency call. The method can alternatively or in addition include receiving, in the relay discovery procedure, an indication of a need of a remote user equipment to conduct an emergency call.

16 Claims, 8 Drawing Sheets

(56) References Cited

OTHER PUBLICATIONS

"3rd Generation Partnership Project; Technical Specification Group Core Network and Terminals; Proximity-services (ProSe) in 5G System (5GS) protocol aspects; Stage 3 (Release 17)", 3GPP TS 24.554 v17.0.0, (Mar. 2022), 271 pages.
International Search Report and Written Opinion for Patent Cooperation Treaty Application No. PCT/EP2023/057346 dated Jul. 17, 2023, 17 pages.
Office Action for European Application No. 23714498.5 dated Nov. 25, 2024, 13 pages.
Office Action for European Application No. 23714498.5 dated Mar. 31, 2025, 6 pages.

\* cited by examiner

PROXIMITY SERVICES EMERGENCY CALL

CROSS-REFERENCE TO RELATED APPLICATIONS

This application is a continuation of U.S. application Ser. No. 18/850,423, filed Sep. 24, 2024, which is a 371 of International Application No. PCT/EP2023/057346, filed Mar. 22, 2023, which claims the benefit of U.S. Provisional Application No. 63/324,488, filed Mar. 28, 2022, the entire contents of which are incorporated herein by reference.

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for providing emergency sessions, such as calls, using a relay provided by proximity services.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to an apparatus. The apparatus can include at least one processor and at least one memory comprising computer program code. The at least one memory and computer program code can be configured, with the at least one processor, to cause the apparatus at least to perform indicating, in a relay discovery procedure, a capability of a relay user equipment to support an emergency call. The at least one memory and computer program code can alternatively be configured, with the at least one processor, to cause the apparatus at least to perform receiving, in the relay discovery procedure, an indication of a need of a remote user equipment to conduct an emergency call.

An embodiment may be directed to an apparatus. The apparatus can include at least one processor and at least one memory comprising computer program code. The at least one memory and computer program code can be configured, with the at least one processor, to cause the apparatus at least to perform indicating, in a relay discovery procedure, a need of a remote user equipment to conduct an emergency call. The at least one memory and computer program code can alternatively be configured, with the at least one processor, to cause the apparatus at least to perform receiving, in the relay discovery procedure, an indication of a capability of a relay user equipment to support an emergency call.

An embodiment may be directed to an apparatus. The apparatus can include at least one processor and at least one memory comprising computer program code. The at least one memory and computer program code can be configured, with the at least one processor, to cause the apparatus at least to perform receiving, from a relay user equipment, a request for an emergency call to be relayed to a remote user equipment by the relay user equipment. The at least one memory and computer program code can also be configured, with the at least one processor, to cause the apparatus at least to perform overriding, in response to the request, at least one restriction otherwise applicable to a call from the remote user equipment.

An embodiment may be directed to an apparatus. The apparatus can include at least one processor and at least one memory comprising computer program code. The at least one memory and computer program code can be configured, with the at least one processor, to cause the apparatus at least to perform determining that at least one relay user equipment is in proximity to a relay user equipment. The at least one memory and computer program code can also be configured, with the at least one processor, to cause the apparatus at least to perform sending a broadcast direct link establishment request with an indication that the request is for an emergency call, while bypassing initial relay selection procedures. The at least one memory and computer program code can further be configured, with the at least one processor, to cause the apparatus at least to perform receiving a response from a relay user equipment accepting the request.

An embodiment may be directed to a method. The method can include indicating, in a relay discovery procedure, a capability of a relay user equipment to support an emergency call. The method can alternatively include receiving, in the relay discovery procedure, an indication of a need of a remote user equipment to conduct an emergency call.

An embodiment may be directed to a method. The method can include indicating, in a relay discovery procedure, a need of a remote user equipment to conduct an emergency call. The method can alternatively include receiving, in the relay discovery procedure, an indication of a capability of a relay user equipment to support an emergency call.

An embodiment may be directed to a method. The method can include receiving, from a relay user equipment, a request for an emergency call to be relayed to a remote user equipment by the relay user equipment. The method can also include overriding, in response to the request, at least one restriction otherwise applicable to a call from the remote user equipment.

An embodiment may be directed to a method. The method can include determining that at least one relay user equipment is in proximity to a relay user equipment. The method can also include sending a broadcast direct link establishment request with an indication that the request is for an emergency call, while bypassing initial relay selection procedures. The method can further include receiving a response from a relay user equipment accepting the request.

An embodiment may be directed to an apparatus. The apparatus can include means for indicating, in a relay discovery procedure, a capability of a relay user equipment to support an emergency call. The apparatus can alternatively include means for receiving, in the relay discovery procedure, an indication of a need of a remote user equipment to conduct an emergency call.

An embodiment may be directed to an apparatus. The apparatus can include means for indicating, in a relay discovery procedure, a need of a remote user equipment to conduct an emergency call. The apparatus can alternatively include means for receiving, in the relay discovery procedure, an indication of a capability of a relay user equipment to support an emergency call.

An embodiment may be directed to an apparatus. The apparatus can include means for receiving, from a relay user equipment, a request for an emergency call to be relayed to a remote user equipment by the relay user equipment. The apparatus can also include means for overriding, in response to the request, at least one restriction otherwise applicable to a call from the remote user equipment.

An embodiment may be directed to an apparatus. The apparatus can include means for determining that at least one relay user equipment is in proximity to a relay user equipment. The apparatus can also include means for sending a broadcast direct link establishment request with an indication that the request is for an emergency call, while bypassing initial relay selection procedures. The apparatus can further include means for receiving a response from a relay user equipment accepting the request.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing emergency sessions, such as emergency calls, using a relay provided by proximity services, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Figure 1:
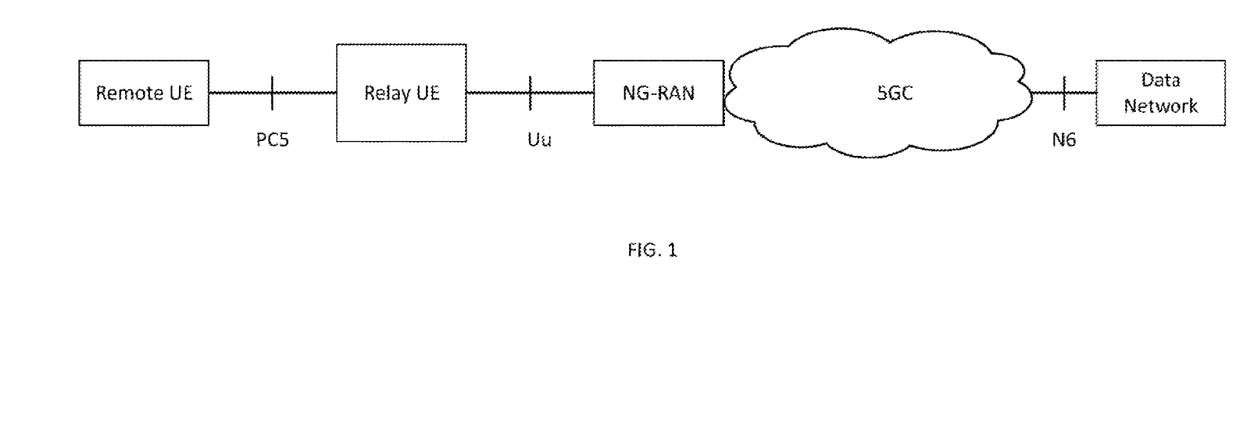
FIG. 1 illustrates an architecture of a user equipment relay.

Third generation partnership project (3GPP) release 17 (Rel-17) fifth generation (5G) proximity services (ProSe) can support transporting the traffic of one user equipment (UE), referred to as a remote UE, via another UE, referred to as a relay UE. FIG. 1 illustrates an architecture of a user equipment relay, according to certain embodiments. As shown in FIG. 1, a remote UE can be connected to a relay UE over an interface referred to as PC5. The relay UE can be connected to a next generation (NG) radio access network (RAN) over an interface referred to as Uu. The NG-RAN can be associated with a fifth generation core (5GC) network, which can be connected to a data network, such as the Internet, over an interface referred to as an N6 interface.

Thus, the relay UE can transport the remote UE's traffic to and from a serving public land mobile network (PLMN). This method of relaying data from a remote UE to can be referred to as UE-to-network relaying and the architecture for it is specified in 3GPP technical specification (TS) 23.304.

Rel-17 5G ProSe supports the relaying of normal priority traffic but not high priority traffic, such as emergency calls. Certain embodiments may provide a way to accommodate relaying high priority traffic, such as emergency calls. Regulatory requirements can cause exceptions in the case of an emergency call: in a UE, in radio interface signaling, and in network behavior.

National regulatory requirements may dictate that, in terms of emergency call routing, an emergency call is to be granted higher priority in the telephony system. Regulatory mandates may also stipulate that an emergency call be allowed to bypass several restrictions that would prevent establishment of a normal call.

Certain embodiments may provide various signaling enhancements that may help to meet the laws set for emergency call, while still performing 5G ProSe UE-to-network relaying.

For example, certain embodiments may help to provide each of the following: an emergency call without valid subscription and with a universal subscriber identity module (USIM); an emergency call in a PLMN where a UE with a valid USIM would not be allowed to make a normal call; an emergency call in an area that the UE is not allowed to use for normal calls because mobility restriction applies; an emergency call via a relay UE that the UE would not be allowed to use for normal communication; an emergency call prioritization at the relay UE, above all other normal traffic; and allowing an option to have an emergency callback at the relay UE.

More particularly, certain embodiments may enhance relay discovery and selection as well as relay connection request for efficient support of emergency call using 5G ProSe UE-to-network relay.

If the remote UE in the architecture of FIG. 1 attempts to set up an emergency call, without certain embodiments both the relay UE and the serving 3GPP network beyond the Uu interface may apply the usual subscription-based and mobility restrictions. Thus, certain embodiments may provide a way to suppress the access rights verification and enforcement that would otherwise be applicable to normal calls and but not applicable to emergency calls. For certain use cases, for example UEs registered in different PLMNs and possibly different countries, it may be impossible to fulfill all emergency call service requirements without indication of emergency priority from the remote user equipment to the relay user equipment.

Before relaying, the remote UE may first discover a relay UE that is able and willing to relay the remote UE's traffic. Then, the remote UE may establish a PC5 connection with the relay UE and register to the PLMN serving the remote UE. The discovery procedure can follow two alternative models that are referred to as discovery model A and discovery model B, and respectively specified in 3GPP TS 23.304 clause 6.3.1.2 and 3GPP TS 23.304 clause 6.3.1.3. In the model A discovery procedure, the announcing UE, which in this case is a relay UE, can take the lead by announcing the relay UE's own presence and availability for PC5 connection with the other UEs. If there is another UE, a remote UE, requiring UE-to-network relaying and the services announced by the announcing UE include the service required by the remote UE, then the remote UE can send discovery request. By contrast, in the model B discovery procedure, the remote UE can send a message indicate that a relay UE is sought. A relay UE capable of and willing to provide service to the remote UE can respond to the remote UE's message.

Figure 2:
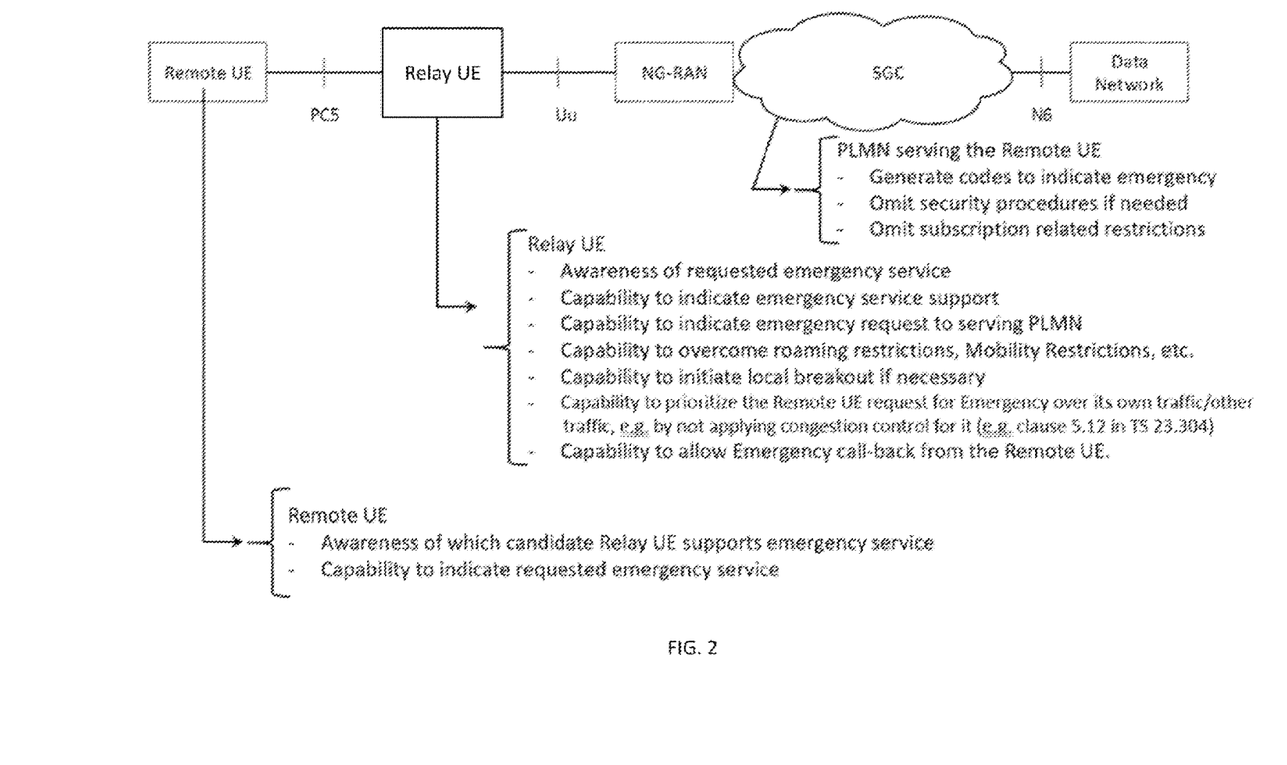
FIG. 2 illustrates aspects of certain embodiments to enable an emergency call over proximity services.

FIG. 2 illustrates aspects of certain embodiments to enable an emergency call over proximity services. As shown in FIG. 2, the remote UE may be given awareness of which candidate relay UE supports emergency service. For example, the remote UE may receive a message from the relay UE that is indicative of such support. In another approach, the remote UE may have the capability to indicate that emergency service is being requested. Other options are possible, for example, the relay UE may indicate to the network the relay UE's capability for handling emergency calls, and a remote UE may query the network for identification of nearby relay UEs that are capable of handling emergency calls. Other approaches are also permitted, with these being examples.

The relay UE may be provided with an awareness of a requested emergency service. For example, as discussed below, the relay UE may receive a discovery message that includes an indication that the discovery message is related to an emergency call. The relay UE may be provided with the capability to indicate emergency service support, for example in a discovery message or otherwise. The relay UE may also be provided with a way to indicate an emergency request related to a remote UE to a serving PLMN. The relay UE may be provided with the capability of overcoming roaming restrictions, mobility restrictions, and the like. The relay UE may be provided with the capability to initiate local breakout if appropriate. The relay Uu may further be provided with the capability to prioritize the remote UE request for emergency over the relay UE's own traffic/other traffic, for example by not applying congestion control for the remote UE's emergency traffic. Furthermore, the relay UE may further be provided with a capability to allow emergency callback from the remote UE.

Furthermore, as also shown in FIG. 2, the PLMN serving the remote UE via the relay UE may be provided with the ability to generate codes to indicate emergency. The PLMN may also be provided with the ability to omit security procedures if appropriate. The PLMN may additionally be provided with the ability to omit subscription related restrictions.

The remote UE and the Relay UE emergency call requirement verification may pose certain benefits during discovery procedure where the Relay UE indicates its capability to support emergency call and the Remote UE indicates its need for emergency service. The identification can take the form of ProSe Application ID and ProSe application code. In such case, the DDNMF assigns the emergency related codes that are needed by the Relay UE to advertise its emergency service capability and the Remote UE to identify the emergency service it requests.

Indications of support for and/or request for support for can be provided, as can the indication to the PLMN. These various indications can be referred to as a mutual indication.

The mutual indication can apply both in discovery model A and model B. In discovery model A, the announcing UE, which can be a candidate relay UE, can indicate, among other services, that the candidate relay UE also supports emergency service. A remote UE attempting to discover a suitable relay UE for the emergency session can limit selection among candidate relay UEs to those that announce emergency service support.

In discovery model B, the remote UE can include an emergency request in the remote UE's discovery request to indicate to the relay UE that emergency exceptions apply. Based on such emergency exceptions, the relay UE can omit security procedures that could prevent normal call via that relay UE.

After that, the remote UE can indicate "a request for Emergency" in a PC5 connection establishment request towards the relay UE, in order to inform the relay UE that this PC5 connection is for an emergency service and not for a non-emergency service, which may facilitate the relay UE to take proper actions, as described both above and below.

If this emergency service negotiation took place when setting up the PC5 connection between the relay UE and the remote UE, then the relay UE can also indicate the emergency call priority in the PDU session towards the serving PLMN. This indication can allow the serving PLMN to lift any possibly applicable restrictions that could prevent the normal priority connections. The serving PLMN can also lift any otherwise applicable restrictions and security procedures that could prevent normal registration of the remote UE.

If it is beneficial for emergency service to be supported via direct connection from remote UE instead of indirect connection through relay UE when remote UE is in network coverage or vice versa for certain type of remote UE, different measurement configuration(s) may be provided for remote UE and relay UE to enable relay discovery for emergency call and normal call. In this way, remote UE may be triggered to discovery relay UE to setup indirect connection for normal call, but setup the direct connection for emergency service or vice versa. Determining which approach is beneficial may be a matter of operator policy or the like.

Figure 3:
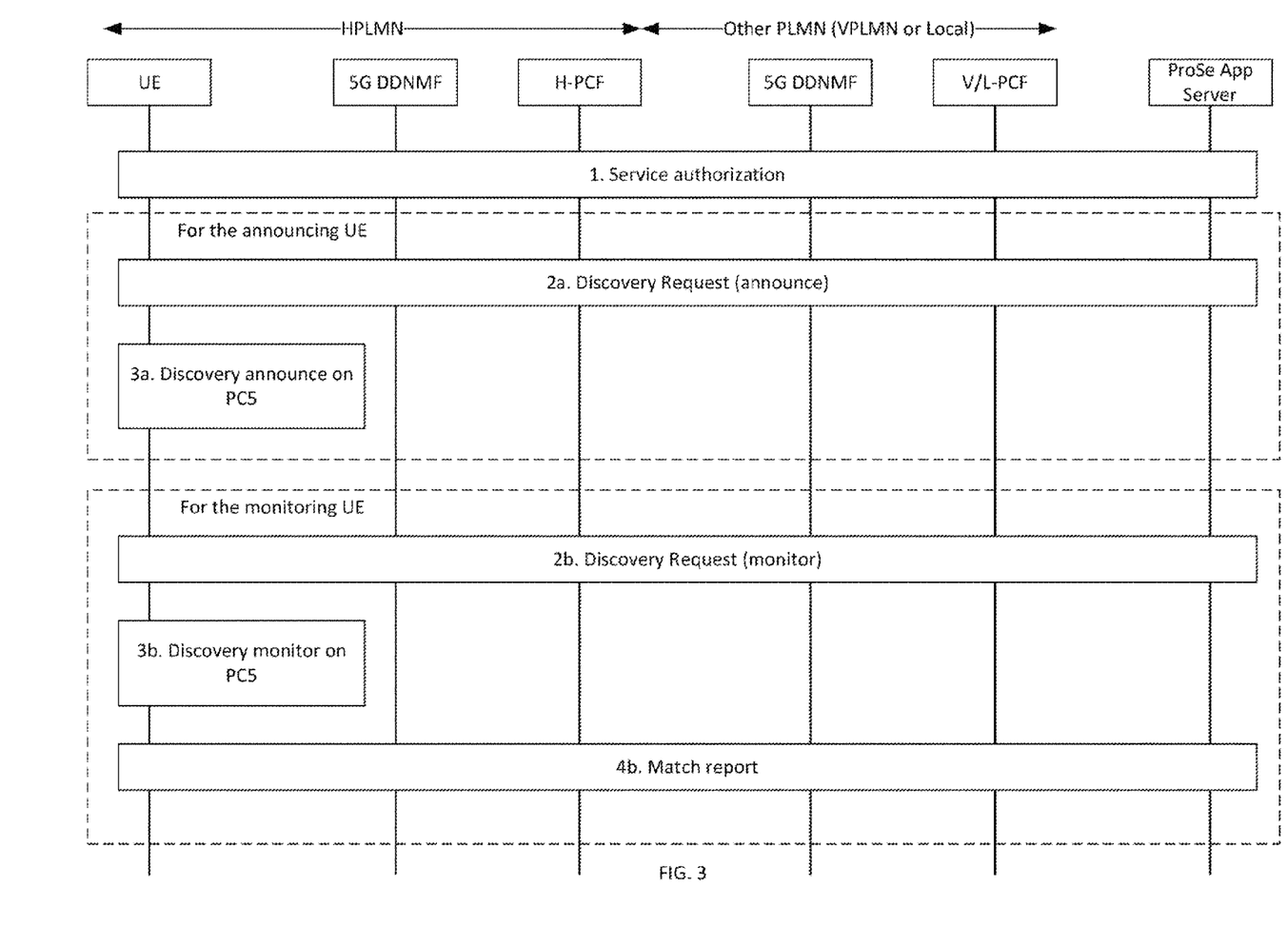
FIG. 3 illustrates a signal flow for an emergency call discovery in a first discovery model, according to certain embodiments.

FIG. 3 illustrates a signal flow for an emergency call discovery in a first discovery model, according to certain embodiments. The flow of FIG. 3 illustrates an approach using discovery model A, which is described as "first," just to distinguish it from the second approach, namely discovery model B, and not to indicate preference, priority, or anything else.

In this example, an emergency call ProSe application code allocated by a direct discovery name management function (DDNMF) allocated can be used as one possible embodiment of the signaling to identify the emergency service. Other codes could also be used.

In FIG. 3, at 1, there can be service authorization for 5G ProSe direct discovery services, for example as defined in clause 6.2 of 3GPP TS 23.304. If the UE is authorized to announce, then at 2a, when the UE is triggered to announce, then the UE can send a discovery request for announcing to the 5G DDNMF in home PLMN (HPLMN) as defined in clause 6.3.1.4 of 3GPP TS 23.304. In addition, for restricted 5G ProSe direct discovery, the 5G DDNMF can further interact with the ProSe application server for the authorization of the discovery request. If the UE is authorized to emergency service, then the DDNMF can also authorize an emergency code to be used in subsequent steps in the discovery.

At 3a, if the request is successful and the UE is provided with ProSe application code/ProSe restricted code, the UE can start announcing on a PC5 interface. If the DDNMF authorizes emergency, then the related code can be announced.

For ProSe restricted discovery and UE requests of on-demand announcing, a ProSe restricted code may be provided to UE after this procedure. In this case, the UE can wait for the ProSe restricted code allocation and can start to announce the ProSe restricted code on PC5 after receiving the code, in announcing alert procedure specified in clause 6.3.1.6 of 3GPP TS 23.304.

More details on the access stratum protocol of this portion of the process are provided in RAN specifications. For instance, a relay UE may be configured with emergency service specific measurement conditions to be triggered to send discovery announce over PC5. A remote UE may be configured with emergency service measurement conditions to be triggered to monitor or discover the relay UEs that support emergency service.

If the UE is authorized to monitor, then at 2b, when the UE is triggered to monitor, the UE can send a discovery request for monitoring to the 5G DDNMF as defined in clause 6.3.1.4 of 3GPP TS 23.304. In addition, for restricted 5G ProSe Direct Discovery, the 5G DDNMF can further interact with the ProSe application server for the authorization of the discovery request. If the UE is authorized for emergency service, then the DDNMF can also authorize an emergency code to be used in subsequent procedures in the discovery.

At 3b, if the request is successful and the UE is provided with a discovery filter that includes ProSe application code(s)/ProSe restricted code(s) and/or ProSe application mask(s), the UE can start monitoring for these ProSe application codes/ProSe restricted codes on the PC5 interface.

If the UE initiates emergency service, then the UE can select an announcer that advertises the emergency service. More details on the access stratum protocol of this procedure are provided in RAN specifications.

At 4b, when the UE detects one or more ProSe application code(s)/ProSe restricted code(s) that match the discovery filter (see, for example, clause 5.8.1 of 3GPP TS 23.304), the UE can report the ProSe application code(s)/ProSe restricted code(s) to the 5G DDNMF as defined in clause 6.3.1.5 of 3GPP TS 23.304.

After step 4b, the announcing UE, in this case the relay UE, may detect that emergency service was requested by the monitoring UE, in this case the remote UE, during the PC5 Connection Establishment Request. If so, then the relay UE can indicate emergency call priority towards the PLMN over Uu interface, for both Layer-2 and Layer-3 relaying.

For layer-2 relaying, if after procedure 4b, the monitoring UE, in this case the remote UE, requests emergency service, the remote UE can indicate this request in the remote UE's NAS registration signaling towards the serving PLMN of the remote UE.

If the PLMN serving the relay UE detects emergency service request, the PLMN can omit the authentication procedures and can override mobility restrictions as applicable for emergency call.

Figure 4:
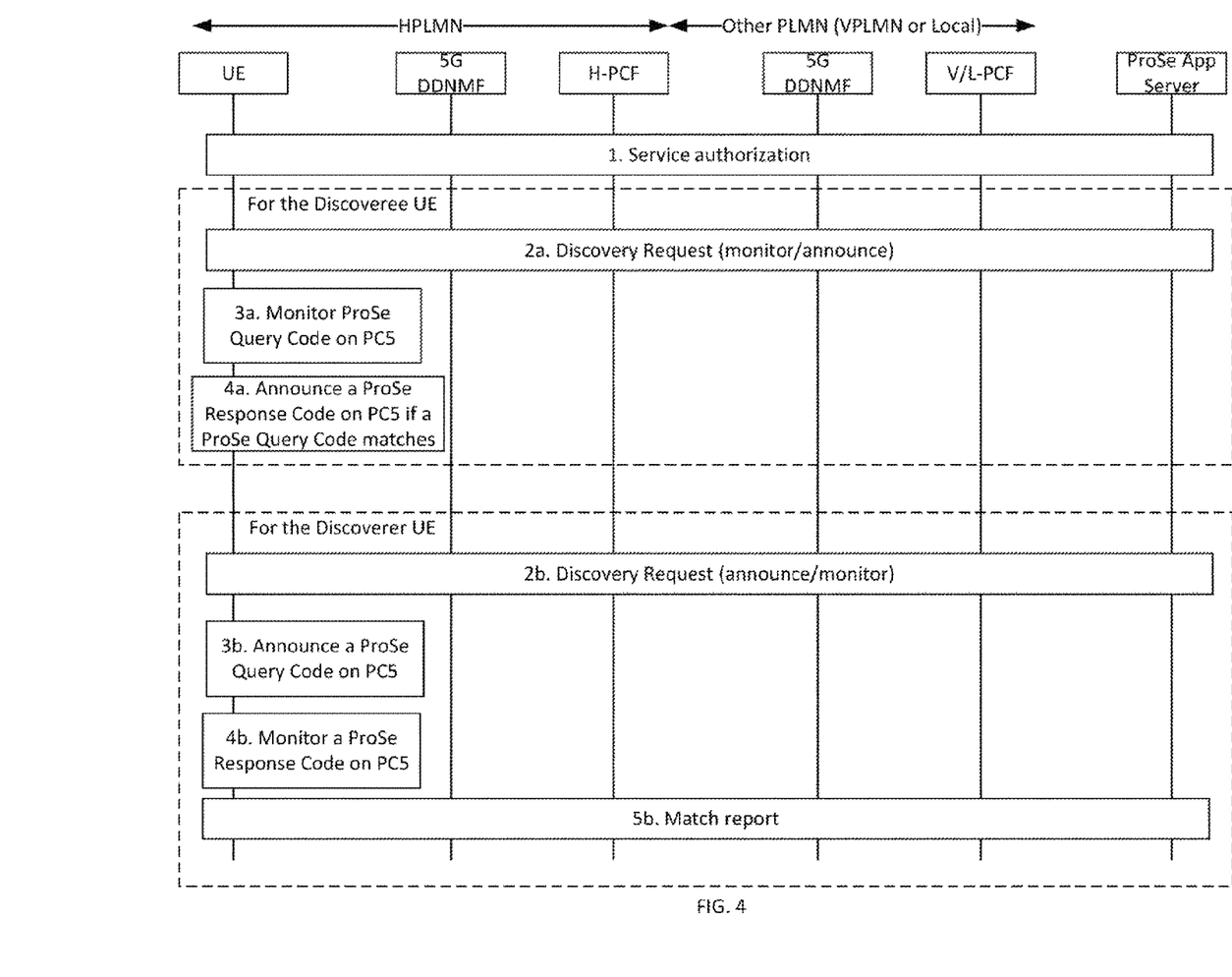
FIG. 4 illustrates a signal flow for an emergency call discovery in a second discovery model, according to certain embodiments.

FIG. 4 illustrates a signal flow for an emergency call discovery in a second discovery model, according to certain embodiments. More particularly, certain embodiments as illustrated in FIG. 4 can relate to discovery model B. In this example case the DDNMF-allocated emergency call ProSe application code is provided as one possible embodiment of the signaling to identify the emergency service. Other ways of identifying the emergency service are also permitted.

The procedure illustrated can be applied for restricted 5G ProSe direct discovery when the ProSe enabled UE is served by NG-RAN. At 1, in FIG. 4, service authorization for 5G ProSe Direct Discovery services can be performed as defined in clause 6.2 of 3GPP TS 23.304.

If the UE is authorized to perform restricted 5G ProSe direct discovery, model B, as a discoveree UE, the following procedures can take place. At 2a, when the UE is triggered to perform restricted 5G ProSe Direct Discovery, model B, the UE can send a discovery request to the 5G DDNMF in the HPLMN to obtain a ProSe response code as defined in clause 6.3.1.4 of 3GPP TS 23.304. The 5G DDNMF can further interact with the ProSe application server for the authorization of the discovery request. If the UE is authorized to emergency service, then the DDNMF can authorize a ProSe response code and associated discovery query filter for emergency service.

At 3a, if the request is successful and the UE is provided with a ProSe response code and an associated discovery query filter(s), then the UE can start monitoring for the ProSe query code on a PC5 interface. Then, at 4a, if a received ProSe query code matches any of the discovery query filter(s), the UE can announce the associated ProSe response code on the PC5 interface.

More details on the access stratum protocol of this procedure are provided in RAN specifications. For instance, a relay UE may be configured with emergency service specific measurement conditions to be triggered to monitor and announce a ProSe response code over PC5.

If the UE is authorized to perform restricted 5G ProSe direct discovery, model B, as a discoverer UE, the following procedures can take place. At 2b, when the UE is triggered to perform restricted 5G ProSe direct discovery, model B, the UE can send a discovery request to the 5G DDNMF in the HPLMN for a ProSe query code as defined in clause 6.3.1.4 of 3GPP TS 23.304. The 5G DDNMF can further interact with a ProSe application server for the authorization of the discovery request. If the UE is authorized for emergency service, then the DDNMF can authorize a ProSe response code and associated discovery query filter for emergency service.

At 3b, if the request is successful and the UE is provided with a ProSe query code and the discovery response filter(s) that include ProSe response code(s) and ProSe application mask(s), the UE can announce the ProSe query code on the PC5 interface. At 4B, the UE can start to monitor on the PC5 interface for any ProSe response code(s) that might match the discovery response filter(s).

More details on the access stratum protocol of this procedure are provided in RAN specifications. For instance, a remote UE may be configured emergency service measurement conditions to be triggered to announce a ProSe enquiry code and monitor a ProSe response code over PC5.

At 5b, when the UE detects a match for one or more ProSe response code(s), the UE can report the ProSe response code to the 5G DDNMF as defined in clause 6.3.1.5 of 3GPP TS 23.304.

After procedure 4b or 5b, the announcing UE, in this case the relay UE, may detect that emergency service was requested by the monitoring UE, in this case the remote UE, during the PC5 Connection establishment request. If so, then the relay UE can indicate emergency call priority towards the PLMN over the Uu interface, for both Layer-2 and Layer-3 relaying.

For layer-2 relaying, if after procedure 4b or 5b, the monitoring UE, in this case the remote UE, requests emergency service, the monitoring UE can indicate the request in the UE's NAS registration signaling towards the UE's serving PLMN.

If the PLMN serving the relay UE detects the emergency service request, the PLMN can omit the authentication procedures and can override mobility restrictions as applicable for emergency call.

Non-roaming direct discovery procedures can cover the case where both the discoveree UE and discoverer UE are served by their respective HPLMN. Roaming direct discovery procedures can cover the other cases.

Figure 5:
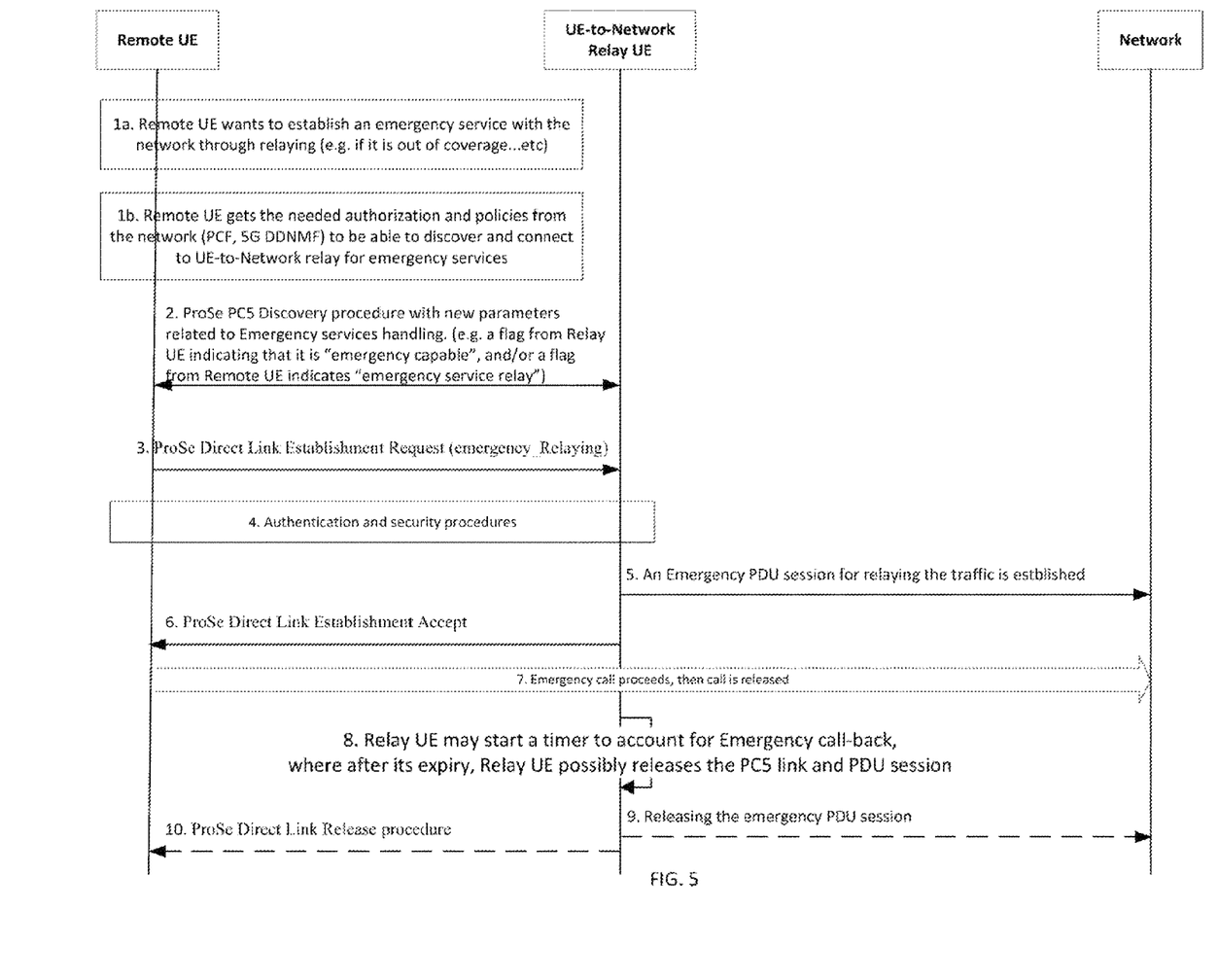
FIG. 5 illustrates connection establishment between a remote user equipment and a relay user equipment, according to certain embodiments.

FIG. 5 illustrates connection establishment between a remote user equipment and a relay user equipment, according to certain embodiments. Certain embodiments may be related to PC5 connection establishment between a remote UE and a relay UE. As shown in FIG. 5, at 1a, a remote UE may want to establish an emergency service, such as an emergency call, with the network through relaying. This may be the case when, for example, the UE is out of coverage. At 1b, the remote UE may obtain the authorization and policies from the network, such as from the policy and charging function (PCF) and 5G DDNMF, to be able to discover and connect to a UE-to-network relay for emergency services.

At 2, the remote UE and UE-to-network relay UE can engage in a ProSe discovery procedure with parameters as described above with reference to FIG. 2 or FIG. 3. The parameters may, for example, be a flag from the relay UE indicating that the relay UE is emergency capable and/or a flag from the remote UE that the remote UE is seeking an emergency service relay.

In procedure 3, the remote UE can indicate a new flag, "emergency_relaying" to the relay UE, to indicate that the PC5 connection establishment request is for relaying purpose. This flag may be in addition to a flag already provided by the remote UE at procedure 2.

The flag at 3 can help the relay UE to properly prioritize the request and take any proper action related to the exceptions followed for emergency services. Thus, the authentication and security procedures at 4 may be abbreviated or omitted. For example, the relay UE may avoid applying congestion control to the remote UE and can avoid rejecting the PC5 connection request due to lack of resources, or the like. The relay UE may release/free up the relay UE's own resources to proceed with the emergency request. Also, the relay UE can establish an emergency protocol data unit (PDU) session at procedure 5 with the network, instead of a normal non-emergency PDU session. At 6, the relay UE can indicate to the remote UE that the ProSe direct link establishment requested at 3 has been accepted. At 7, the emergency call can the proceed and eventually be released.

At 8, after the emergency call is released, the relay UE may start a timer to account for emergency call-back, after which the relay UE can possibly release the PC5 link at 10 and the PDU session at 9.

In certain embodiments, for a quick and reliable setup of an emergency-call session for the Remote UE, the Remote UE may be allowed to bypass the initial relay selection. For example, the remote UE may perform a quick relay discovery to discover there is at least one U2N relay UE in proximity. The remote UE may then be allowed to bypass initial relay selection by sending a broadcast ProSe direct link establishment request, or direct communication request (DCR), which may be enhanced for the targeted emergency call request. For example, there may be included an indication that the broadcast DCR is an emergency call. Moreover, there may or may not be an indication of a particular selected relay UE. The remote UE may then select and use either a selected relay UE as indicated in the DCR or the first relay UE that responds to the DCR specific to the emergency call request of the Remote UE.

In one embodiment, the remote UE may be configured to indicate the remote UE's geo-location information in the ProSe direct link establishment request or DCR for the emergency call if the remote UE's geo-location information is available.

In certain embodiments, in case the ProSe direct link establishment request or DCR for the emergency call received from the remote UE does not include the geo-location information of the remote UE, the relay UE may use the relay UE's own geo-location information instead, together with the relay UE's own IP based location information, for requesting the network to set up an emergency-call session for the remote UE.

Figure 6A:
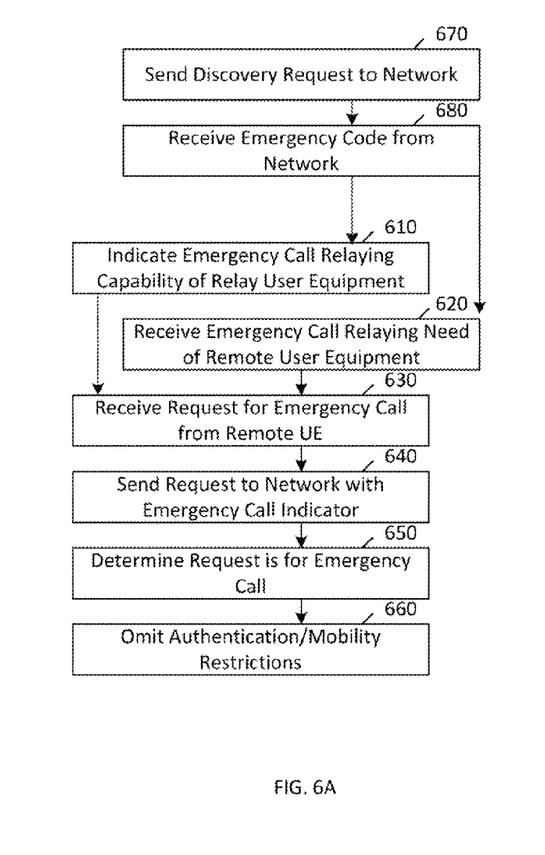
FIG. 6A illustrates an example flow diagram of a method, according to an embodiment.

FIG. 6A illustrates an example flow diagram of a method for providing emergency sessions, such as emergency calls, using a relay provided by proximity services, according to certain embodiments.

The method can include, at 610, indicating, in a relay discovery procedure, a capability of a relay user equipment to support an emergency call or other emergency session.

The method can also include, at 620, receiving, in the relay discovery procedure, an indication of a need of a remote user equipment to conduct an emergency call. Although the indicating at 610 and receiving at 620 may represent opposite discovery modes, a given user equipment may be equipped for one or both modes.

The method can further include, at 630, receiving from the remote user equipment a request for an emergency call to be relayed to the remote user equipment by the relay user equipment.

The method can additionally include, at 640, sending, to a network, the request including an emergency relaying indicator.

The method can also include, at 650, determining that the request is for the emergency call.

The method can further include, at 660, omitting at least one authentication process or mobility restriction for the remote user equipment based on the determination when setting up the emergency call.

The method can further include, at 670, sending a discovery request to a network. The sending the discovery can be triggered according to emergency-specific measurement conditions. The method can additionally include, at 680, obtaining an emergency code from the network in response to the discovery request. The emergency code can be included when indicating the capability.

It is noted that FIG. 6A is provided as one example embodiment of a method or process. However, certain embodiments are not limited to this example, and further examples are possible as discussed elsewhere herein.

Figure 6B:
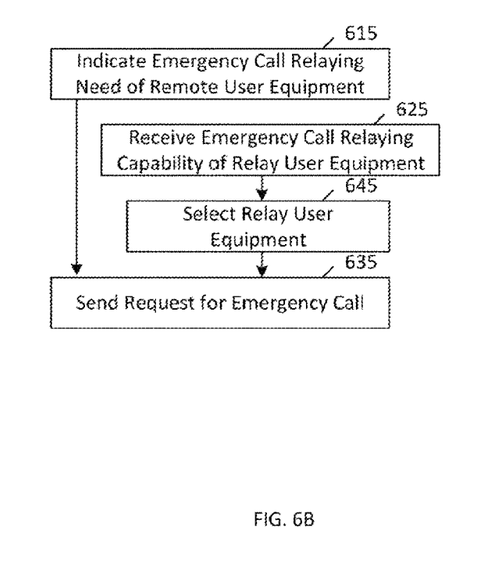
FIG. 6B illustrates an example flow diagram of a method, according to an embodiment.

FIG. 6B illustrates an example flow diagram of a method for providing emergency sessions, such as emergency calls, using a relay provided by proximity services, according to certain embodiments. The method of FIG. 6B can be used alone or in combination with the method of FIG. 6A. The methods of FIGS. 6A and 6B can be implemented by a signal flow such as shown in FIGS. 2 and 3. Moreover, a same user equipment may be configured to perform the illustrated procedures of FIGS. 6A and 6B.

The method of FIG. 6B may include, at 615, indicating, in a relay discovery procedure, a need of a remote user equipment to conduct an emergency call.

The method can also include, at 625, receiving, in the relay discovery procedure, an indication of a capability of a relay user equipment to support an emergency call. Although the indicating at 615 and receiving at 625 may represent opposite discovery modes, a given user equipment may be equipped for one or both modes.

The method can further include, at 635, sending from the remote user equipment a request for an emergency call to be relayed to the remote user equipment by the relay user equipment. The sending the request can be triggered according to emergency-specific measurement conditions. The request can further include an indication that the emergency call is for emergency service, in a non-access stratum registration signaling to a network.

The method can additionally include, at 645, selecting the relay user equipment based on the indication of the capability.

It is noted that FIG. 6B is provided as one example embodiment of a method or process. However, certain embodiments are not limited to this example, and further examples are possible as discussed elsewhere herein.

Figure 6C:
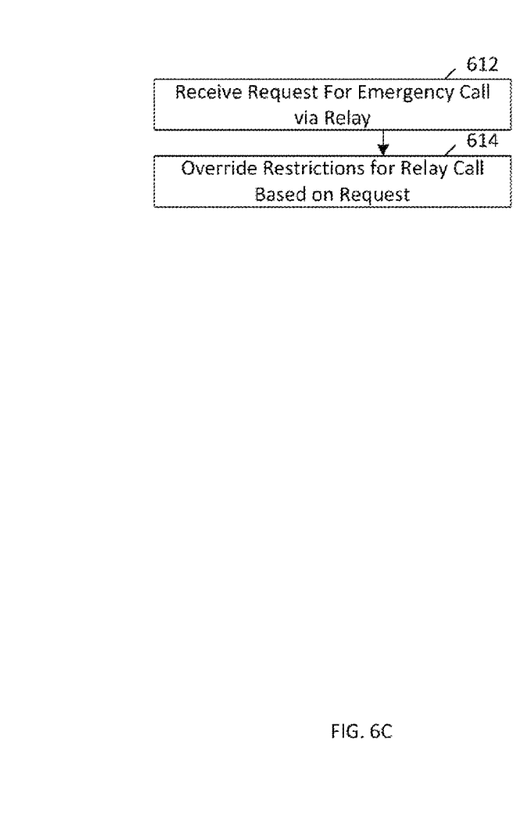
FIG. 6C illustrates an example flow diagram of a method, according to an embodiment.

FIG. 6C illustrates an example flow diagram of a method for providing emergency sessions, such as emergency calls, using a relay provided by proximity services, according to certain embodiments.

As shown in FIG. 6C, a method can include, at 612, receiving, from a relay user equipment, a request for an emergency call to be relayed to a remote user equipment by the relay user equipment. The method can also include, at 614, overriding, in response to the request, at least one restriction otherwise applicable to a call from the remote user equipment. The request can include an emergency relaying indicator. The overriding the at least one restriction comprises at least one of omitting an authentication procedure or overriding a mobility restriction.

It is noted that FIG. 6C is provided as one example embodiment of a method or process. However, certain embodiments are not limited to this example, and further examples are possible as discussed elsewhere herein.

Figure 6D:
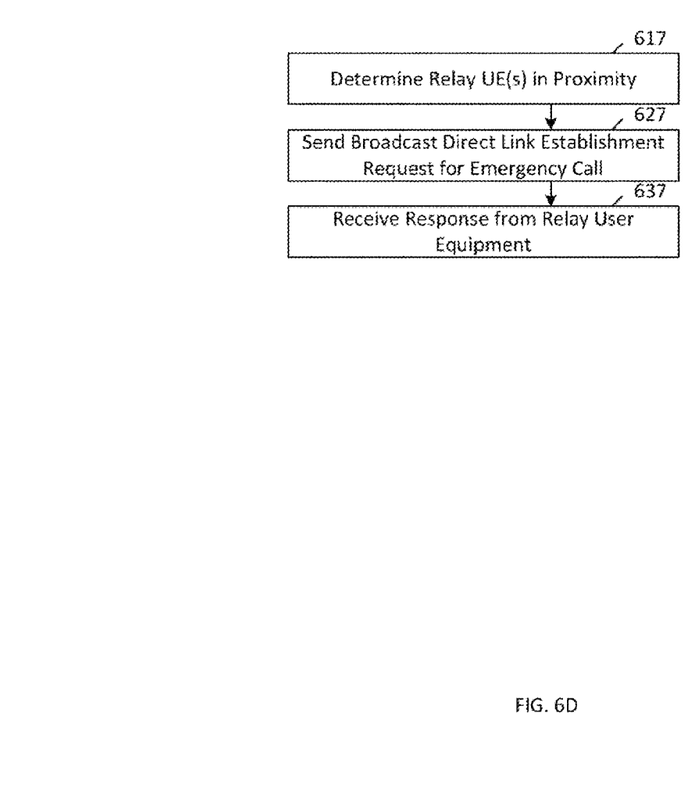
FIG. 6D illustrates an example flow diagram of a method, according to an embodiment.

FIG. 6D illustrates an example flow diagram of a method for providing emergency sessions, such as emergency calls, using a relay provided by proximity services, according to certain embodiments.

As shown in FIG. 6D, a method can include, at 617, determining that at least one relay user equipment is in proximity to a relay user equipment. Proximity can be determined by reception of signals from the relay user equipment. The method can also include, at 627, sending a broadcast direct link establishment request with an indication that the request is for an emergency call, while bypassing initial relay selection procedures. The overriding the at least one restriction comprises at least one of omitting an authentication procedure or overriding a mobility restriction. The method can also include, at 637, receiving a response from a relay user equipment accepting the request.

It is noted that FIG. 6D is provided as one example embodiment of a method or process. However, certain embodiments are not limited to this example, and further examples are possible as discussed elsewhere herein.

Figure 7:
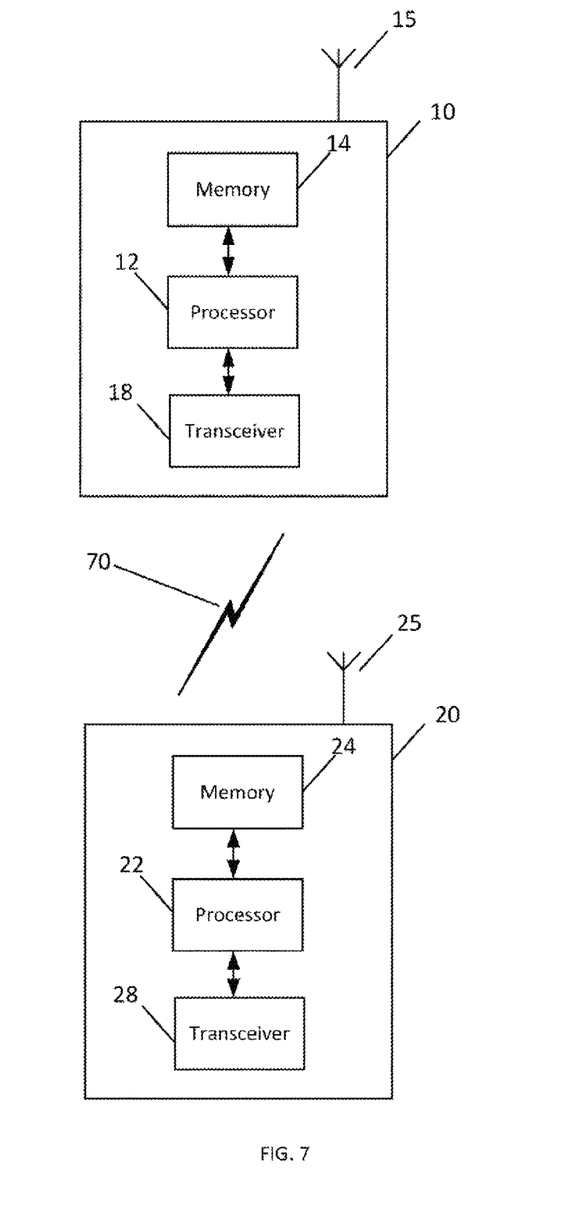
FIG. 7 illustrates an example block diagram of a system, according to an embodiment.

FIG. 7 illustrates an example of a system that includes an apparatus 10, according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may comprise an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a mid-haul interface, referred to as an F1 interface, and the DU(s) may have one or more radio unit (RU) connected with the DU(s) over a front-haul interface. The DU may be a logical node that includes a subset of the gNB functions, depending on the functional split option. It should be noted that one of ordinary skill in the art would understand that apparatus 10 may include components or features not shown in FIG. 7.

As illustrated in the example of FIG. 7, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 7, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 3, 4, 5, 6A, 6B, 6C, 6D, or any other method described herein. In some embodiments, as discussed herein, apparatus 10 may be configured to perform a procedure relating to providing emergency sessions, such as emergency calls, using a relay provided by proximity services, for example.

FIG. 7 further illustrates an example of an apparatus 20, according to an embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7.

As illustrated in the example of FIG. 7, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 3, 4, 5, 6A, 6B, 6C, 6D, or any other method described herein. For example, in an embodiment, apparatus 20 may be controlled to perform a process relating to providing emergency sessions, such as emergency calls, using a relay provided by proximity services, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and/or advantages. For example, certain embodiments may permit compliance with regulations that may prevent various restrictions on emergency call placement. Moreover, certain embodiments may provide fast and efficient mechanisms for identifying and using emergency call capable relay user equipment. In certain embodiments, the assigned emergency-related codes may be configured to steer the relay user equipment behavior to represent the relay UE's emergency request, emergency priority, override restriction(s), and allow limited-service emergency calling. Accordingly, in certain embodiments the network may be able to accurately and expeditiously handle an emergency request from a relay UE regarding a remote UE.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

DDNMF Direct Discovery Name Management Function
gNB Next Generation Node-B
PLMN Public Land Mobile Network
UE User Equipment

We claim:
1. A method, comprising:
sending a discovery request from a user equipment via a public land mobile network to a proximity services (ProSe) application server;
obtaining, by the user equipment from the ProSe application server, a code for emergency services;
in a relay discovery procedure, indicating, by the user equipment to the public land mobile network for access by a remote user equipment, a capability of the user equipment to support an emergency call, wherein the code for emergency services is included when indicating the capability;

receiving by the user equipment from the remote user equipment a request for an emergency call involving the remote user equipment that is to be relayed by the user equipment, wherein the request includes a code from the remote user equipment;

matching the code for emergency services with the code from the remote user equipment;

in response to the matching, sending, from the user equipment to the public land mobile network, the request including an emergency relaying indicator to cause at least one restriction applicable to a call from the remote user equipment to be overridden;

determining, by the user equipment, that the request is for the emergency call, wherein the request includes an indication that the request is for an emergency call; and omitting, by the user equipment, at least one authentication process or mobility restriction for the remote user equipment based on the determination when setting up the emergency call.

2. The method of claim 1, wherein the sending the discovery request is triggered according to emergency-specific measurement conditions.

3. A user equipment, comprising:
at least one processor; and
at least one memory comprising computer program instructions,
wherein the at least one memory and the computer program instructions are configured to, with the at least one processor, cause the user equipment at least to perform:

sending a discovery request by the user equipment via a public land mobile network to a proximity services (ProSe) application server;

obtaining, by the user equipment from the ProSe application server, a code for emergency services;

in a relay discovery procedure, indicating, by the user equipment to the public land mobile network for access by a remote user equipment, a capability of the user equipment to support an emergency call, wherein the code for emergency services is included when indicating the capability;

receiving by the user equipment from the remote user equipment a request for an emergency call involving the remote user equipment to be relayed to the remote user equipment by the user equipment, wherein the request includes a code from the remote user equipment;

matching the code for emergency services with the code from the remote user equipment;

in response to the matching, sending, from the user equipment to the public land mobile network, the request including an emergency relaying indicator to cause at least one restriction applicable to a call from the remote user equipment to be overridden;

determining, by the user equipment, that the request is for the emergency call, wherein the request includes an indication that the request is for an emergency call; and omitting, by the user equipment, at least one authentication process or mobility restriction for the remote user equipment based on the determination when setting up the emergency call.

4. The user equipment of claim 3, wherein the sending the discovery request is triggered according to emergency-specific measurement conditions.

5. The method of claim 1, further comprising prioritizing the request for the emergency call over other traffic of the user equipment.

6. The method of claim 5, wherein the request for the emergency call is prioritized by not applying congestion control for emergency traffic from the remote user equipment.

7. The method of claim 1, wherein omitting at least one authentication process or mobility restriction further comprises omitting security procedures.

8. The method of claim 1, wherein omitting at least one authentication process or mobility restriction further comprises overcoming roaming restrictions.

9. The method of claim 1, further comprising allowing emergency callback from the remote user equipment.

10. The method of claim 1, wherein receiving the request for the emergency call comprises receiving the request for the emergency call via a PC5 interface.

11. The user equipment of claim 3, wherein the at least one memory and the computer program instructions are further configured to, with the at least one processor, cause the user equipment to prioritize the request for the emergency call over other traffic of the user equipment.

12. The user equipment of claim 11, wherein the request for the emergency call is prioritized by not applying congestion control for emergency traffic from the remote user equipment.

13. The user equipment of claim 3, wherein omitting at least one authentication process or mobility restriction further comprises omitting security procedures.

14. The user equipment of claim 3, wherein omitting at least one authentication process or mobility restriction further comprises overcoming roaming restrictions.

15. The user equipment of claim 3, wherein the at least one memory and the computer program instructions are further configured to, with the at least one processor, cause the user equipment to allow emergency callback from the remote user equipment.

16. The user equipment of claim 3, wherein receiving the request for the emergency call comprises receiving the request for the emergency call via a PC5 interface.

* * * * *